(12) United States Patent  (10) Patent No.: US 7,480,368 B2
Sipher  (45) Date of Patent: Jan. 20, 2009

(54) PROVIDING VOICE MESSAGES TO AN INTENDED RECIPIENT

(75) Inventor: Joseph K. Sipher, Sunnyvale, CA (US)

(73) Assignee: Pinger, Inc., San Jose, CA (US)

( * ) Notice: Subject to any disclaimer, the term of this patent is extended or adjusted under 35 U.S.C. 154(b) by 0 days.

(21) Appl. No.: 11/842,907

(22) Filed: Aug. 21, 2007

(65) Prior Publication Data

US 2008/0043939 A1    Feb. 21, 2008

Related U.S. Application Data

(60) Provisional application No. 60/823,079, filed on Aug. 21, 2006.

(51) Int. Cl.
H04M 1/64    (2006.01)

(52) U.S. Cl. .............. 379/88.12; 379/88.16; 379/88.25; 455/412.2

(58) Field of Classification Search ................ 379/45, 379/88.12, 88.25, 88.16; 455/414.1, 412.2
See application file for complete search history.

(56) References Cited

U.S. PATENT DOCUMENTS

| 6,011,833 | A  | * | 1/2000  | West ........................ 379/88.25 |
| 6,246,752 | B1 |   | 6/2001  | Bscheider et al. |
| 6,643,355 | B1 | * | 11/2003 | Tsumpes ...................... 379/45 |
| 6,950,502 | B1 | * | 9/2005  | Jenkins ..................... 379/88.12 |
| 6,990,094 | B1 |   | 1/2006  | O'Neal et al. |
| 2005/0020250 | A1 | * | 1/2005 | Chaddha et al. .......... 455/414.1 |
| 2006/0018441 | A1 |   | 1/2006 | Timmins et al. |
| 2006/0198504 | A1 |   | 9/2006 | Shemisa et al. |

* cited by examiner

Primary Examiner—Gerald Gauthier
(74) Attorney, Agent, or Firm—RaubVogel Law Office

(57) ABSTRACT

A voice message service provider enables users to access voice messages through a first access point for creating voice messages and a second access point for retrieving the created voice messages. In one implementation, a user calls the first access point to create a message, and the voice message provider indexes the created voice message with a message retrieval telephone number and one or more recipient identifiers. A notification message containing the message retrieval telephone number is sent to the intended recipient to provide notification of the voice message. The intended recipient may retrieve the voice message by calling the message retrieval number contained within the notification message and providing the recipient identifier. The voice message service provider identifies the voice message associated with the message retrieval number and recipient identifier and returns the voice message to the intended recipient.

9 Claims, 4 Drawing Sheets

_US 7,480,368 B2_

PROVIDING VOICE MESSAGES TO AN INTENDED RECIPIENT

CROSS-REFERENCE TO RELATED APPLICATIONS

This application claims the benefit of U.S. Provisional Application No. 60/823,079, filed Aug. 21, 2006, which is incorporated herein by reference in its entirety.

BACKGROUND

1. The Field of the Invention

Implementations of the present invention relate to systems and methods for storing and/or delivering voice messages.

2. The Relevant Technology

Current voice mail systems generally require a user to listen to or otherwise manage each received voice message, such as in a chronological fashion. For example, when a user receives a call but is unable to answer, conventional voicemail systems might record a voice message from the caller, store the voice message in a voice mail inbox for the recipient user, and send an alert to the recipient user. Upon receiving the alert, the recipient user might then dial a voice message access number, upon which the voice messaging system might provide the recipient user with one or more options for retrieving the voice message. For example, the voice messaging system might prompt the user to supply one or more security codes to access a specific voice message inbox. After doing so successfully, the recipient user may then be allowed to scroll through the stored messages in the voice message inbox, and listen to the most recently received message, as desired.

Unfortunately, going through the voice messaging system to retrieve voice messages from a single voice message inbox can be inefficient. In particular, conventional voice messaging systems tend to provide little information in a voice message alert other than the mere fact that a voice message has been received. Thus, a user is often alerted that a voice message has been received, but may not be able to determine the identity of the source of the voice message. Adding to this inconvenience is the notion that conventional voice messaging systems often require a user to listen to several headers/options before actually playing back any given message.

For example, after successfully logging into a voice messaging inbox, conventional voice messages might initially present option information such as, "To get messages, press '1.'" After selecting "1," the conventional voice messaging system might then present additional header information, such as "Call Received [Date] at [Time], from [Phone Number—if available] . . . to listen to this message, press '1.'" Only after pressing "1" again might the conventional voice messaging system begin to play back the message. These sequences of steps can delay the immediacy by which a user hears a given voice message. Furthermore, if the recipient user is expecting a particular voice mail, and the voice message being played back is not what is expected, the recipient user may need to skip the message being played, and go through the aforementioned steps—potentially several times—until retrieving the expected voice message.

BRIEF SUMMARY OF THE INVENTION

Implementations of the present invention solve one or more problems in the art with systems, methods, and computer program products configured to provide users with direct access to specific voice messages using dual access points. In one implementation, for example, a voice message sender calls a first access point, such as a telephone number of a voice messaging system, and leaves a voice message. The voice messaging system may then associate one or more recipient identifiers with the voice message, such as a caller ID of the intended recipient's phone, and also associates a message retrieval telephone number with the voice message. The voice messaging system then sends a notification message containing the message retrieval telephone number to the intended recipient. Upon receiving the retrieval message, the recipient user can access the voice message directly via a second access point by calling the message retrieval telephone numbers provided in retrieval message and submitting the recipient identifier, such as the caller ID for the recipient phone.

Another embodiment of the invention relates to a method of delivering a voice message. The example method may include receiving a voice message from a sender that is directed to an intended recipient. In addition, the method may include assigning a message retrieval telephone number to the received message. The method can also involve correlating the assigned message retrieval telephone number and the received voice message to a recipient identifier. In such a case, the message retrieval as telephone number will be unique compared to the message retrieval telephone number already assigned to other voice messages stored for the recipient, such that each combination of a recipient identifier and a message retrieval telephone number is unique. A single message retrieval telephone number may be assigned to voice messages for other intended recipients. The method can further involve preparing and sending a notification message to the intended recipient of the voice message, where the message includes at least the retrieval phone number.

Another embodiment of the invention relates to a method of retrieving voice messages by a handheld device. The method may include receiving a notification message from a voice message provider. As described above, the notification message notifies the intended recipient of a voice message addressed to the intended recipient and includes a retrieval telephone number. The handheld device receives an indication from the intended recipient that the voice message is to be retrieved. Upon receiving the indication from the intended recipient, the handheld device automatically calls the retrieval telephone number included in the voice message. Finally, the handheld device is provided access to the voice message by the voice message provider.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF PREFERRED EMBODIMENTS

Implementations of the present invention extend to systems, methods, and computer program products configured to provide users with direct access to specific voice messages using dual access points. In one implementation, for example, a caller calls a first access point, such as a telephone number of a voice messaging system, and leaves a voice message. The voice messaging system can then associate one or more unique identifiers with the voice message, such as a caller identifier of the intended recipient's phone. The system sends a retrieval message to the intended recipient to notify the recipient of the arrival of a new voice message. The retrieval message may include a retrieval phone number, that when dialed, calls a central location via a second access point to retrieve the voice message. Therefore, upon receiving the retrieval message, the recipient user can access the voice message directly simply by calling the number provided in retrieval message and submitting any of the one or more unique identifiers, such as the caller ID for the recipient phone.

Accordingly, one will appreciate that implementations of the present invention can provide a great deal of efficiency with regard to creating and sending voice messages. In particular, a user can listen to a specific voice message directly, rather than having to first interact with multiple system interface options.

In addition, and as will be understood more fully herein, implementations of the present invention can easily be modified to include such features as voice as message threading. For example, a recipient may receive a notification with regard to the arrival of a voice message. Upon listening to the voice message using the second access point, the voice message service provider can further provide the recipient with an option of responding to the voice message. Upon creating a response voice message, the voice message service provider may send a second notification to the sender of the original voice message that includes a unique message retrieval number for the reply message, as well as additional information to indicate that the reply voice message is a response to the original voice message.

Figure 1:
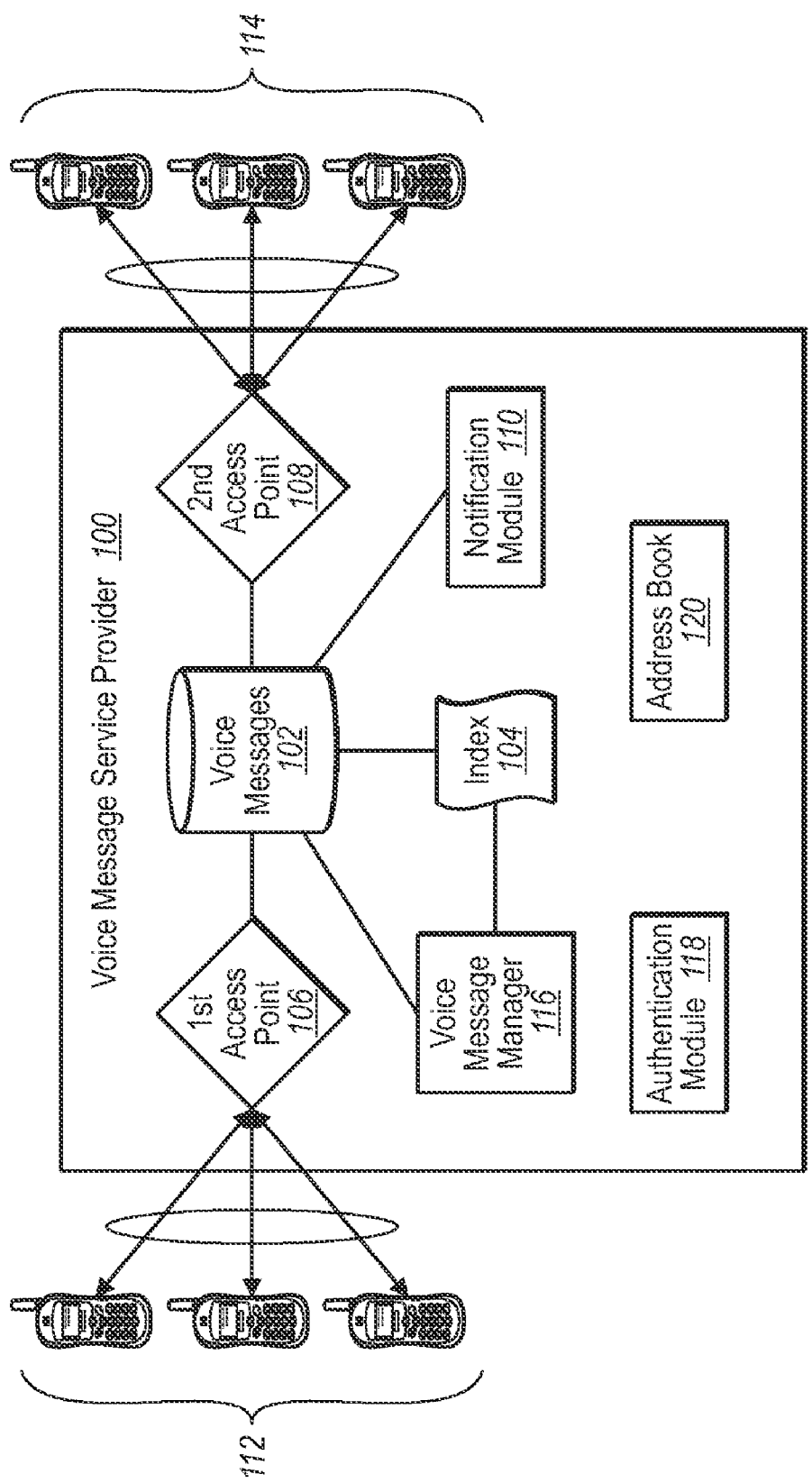
FIG. 1 illustrates one example of a voice message service provider, in accordance with an implementation of the present invention.

Referring now to FIG. 1, an example voice message service provider 100 is illustrated for receiving and managing voice messages. The voice message service provider 100 includes a first access point 106 and a second access point 108. The first access point 106 may be used for receiving new voice messages from voice message senders 112. The newly received voice messages may be stored in the voice message database 102. The second access point 108 may be used to allow voice message recipients 114 to access the voice messages 102.

When a new voice message 102 is received from a voice message sender 112, a voice message manager 116 may associate the newly received voice message with a message identifier, a recipient identifier and a message retrieval telephone number, and may store the associated data in an index 104.

After the newly received voice message is stored in the database 102 and a new entry is placed in the index 104, the notification module 110 sends a notification message to the intended recipient 114. The notification message may include the message retrieval telephone number, as well as a brief notice of the newly received a message.

The intended recipient 114 may retrieve the newly received voice message by dialing the message retrieval telephone number included within the notification message. Upon dialing the message retrieval telephone number, the voice message service provider 110 checks the index 104 to identify the appropriate voice message, and sends the voice message to the intended recipient 114 via the second access point 108.

Figure 2A:
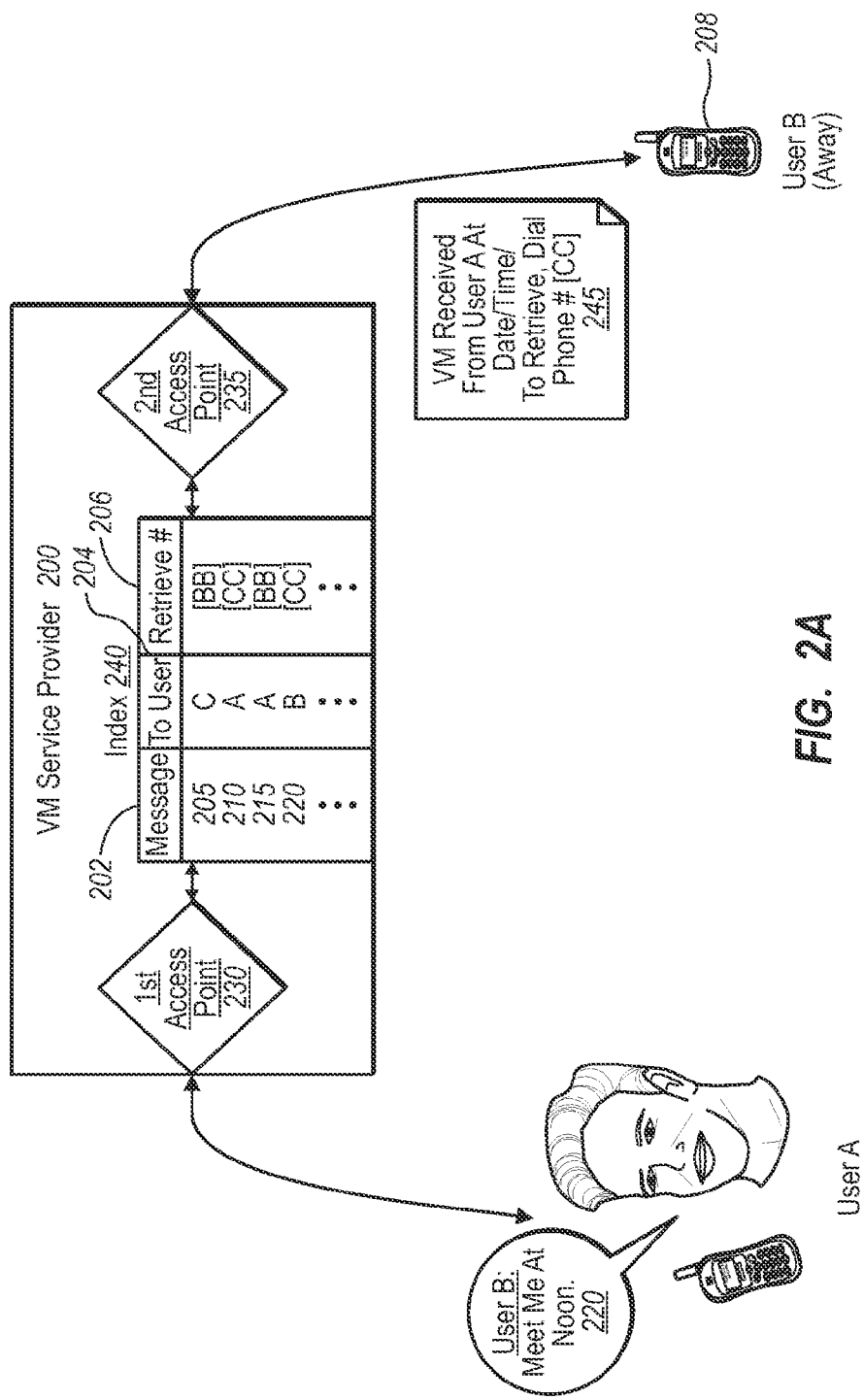
FIG. 2A illustrates an example overview schematic diagram in which a user creates a voice message to be delivered to another user in accordance with an implementation of the present invention.

Referring now to FIG. 2A illustrates an overview schematic diagram in which a user (i.e., "User A") creates a voice message (e.g., 220) intended for another user ("User B"). For example, User B is presently unavailable, or User A would simply prefer to leave a voice message that User B can access at a convenient time. To create this voice message, User A calls a first access point 230 provided by the voice message service provider ("VM Provider") 200 directly. In one embodiment, the first access point 230 may be accessed by a user by dialing a predefined telephone number (i.e., "[AA]") that is dedicated for receiving calls for creating voice messages. Thus, the access point can be called by a sender of a voice message directly, or alternatively, in other implementations, a phone service may automatically transfer User A to the first access point 230 upon detecting that User B is not answering the phone.

Upon dialing the access point, FIG. 2A shows that User A connects to VM Provider 200 through the first access point 230, which is used to create voice messages. In one implementation, for example, the first access point 230 includes any number of interfaces so that when User A connects, the first access point 230 provides one or more response options for creating and sending the voice message. For example, in one embodiment, and referring again to FIG. 1, a user may log in using an authentication module 118 by providing appropriate authentication information (e.g., caller ID, numerical or voice-based password, etc.). However, logging in may as only be required when the caller desires to access personalized information, such as an address book 120.

Referring again to FIG. 2A, User A may be prompted to submit information for identifying an intended recipient (e.g., User B). For instance, the user may submit the telephone number or other identifier for identifying User B. In another embodiment, referring to FIG. 1, the voice message service provider 100 may include an address book 120 containing contact information for one or more users of the system. Therefore, referring now to the FIG. 2A example, User A may select the intended recipient from a list of contacts included in an address book 120.

In one embodiment, voice recognition may be employed by the VM service provider 200 such that the user may simply recite the name of the intended recipient, i.e., "User B." The first access point 230 may then confirm the identity of the intended recipient by providing an additional response to User A's phone, such as, "You have requested 'User B.' If this is incorrect press * or say 'no'." The user may also be given the opportunity to submit the names of multiple intended recipients such that a single voice message can be sent to multiple people. Upon submitting the identities of all intended recipients, the user is prompted to recite the voice message. Thus, FIG. 2A shows that, at an appropriate point, User A recites voice message 220 through a telephone. For example, FIG. 2A shows that the User A recites, "Meet me at noon."

Upon completing the voice message, VM Provider 200 then stores the voice message and creates an entry in the index 240. As described previously, the index 240 may include a reference 202 to the message, a reference to the intended recipient 204, and a reference 206 to a retrieval telephone number. The retrieval telephone numbers 206 may be selected from a predefined list of retrieval numbers, as that when dialed by a specific user, may retrieve a message intended for that specific user. When assigning a retrieval number 206 to a message, the VM service provider 200 will typically assign a unique retrieval number to each message sent to a single intended recipient. Therefore, the retrieval numbers may be assigned to multiple messages that are each intended for a different recipient.

By way of example, the index 240 includes references 202 to previously stored voice messages 205, 210, and 215, which are intended for users "C," "A," and again to "A," respectively. Furthermore, FIG. 2A shows that VM Provider 200 has assigned each message 205, 210, and 215 to retrieval phone numbers "[BB]," or "[CC]." Thus, phone number "[BB]" has been assigned to message 205 for User C, as well as to message 215 for user A. Furthermore, phone number "[CC]" has been assigned to message 210 for user A.

As illustrated in the current example, it is not necessary that each retrieval phone number 206 assigned to the voice message 205, 210, 215, 220, be unique, since each retrieval phone number is also associated with an intended recipient 206 such that each entry in the index 240 is a unique combination. That is, each retrieval phone number 206 can be assigned to several different voice messages within index 240 that are each addressed to a different intended recipient. Therefore, any given intended recipient user will typically have a different retrieval phone number for each voice message in index 240 that is addressed to that intended recipient. In the event that a recipient user receives more voice messages than then number of predefined retrieval telephone numbers, the system 200 may begin assigning retrieval telephone numbers to multiple messages for that user.

After generating an entry for the newly received message (e.g., 220) in the index 240, the VM Provider 200 sends a retrieval message 245 to the telephone 208 as (or other appropriate device) of the intended recipient (i.e., "User B"). For example, User B may have submitted user preferences to request that retrieval messages be sent to his or her cellular/mobile phone 208. Alternatively, User B may have registered an email address or other means of receiving an audio file other than necessarily telephonic delivery mechanisms. In another embodiment, User A may specify the manner in which the notification message will be sent to the intended recipient ("User B"), for example, by providing a telephone number for the intended recipient, which may be stored in the address book 120 (FIG. 1). In this particular example, User B receives the notification message 245 via a cellular telephone 208.

In general, the retrieval message 245 may include any type of notification that is appropriately formatted for the receiving device. In some cases, for example, message 245 may include HTML, Javascript, or otherwise interface-appropriate formatting. The message 245 may also include other common messaging formats, including SMS ("Short Message Service"), MMS ("Multimedia Message Service"), IM ("Instant Message"), and the like.

In the present example illustrated in FIG. 2A the VM service provider 200 sends the notification message 245 to only one intended recipient, User B, because User A only indicated a single recipient. Had User A indicated multiple recipients when creating the voice message 220, the VM service provider 200 may send a notification message to each identified intended recipient, where each notification message is specifically formatted for the registered receiving device, and includes a retrieval telephone number that is specific for each intended recipient. In one embodiment, where a single voice message is sent to multiple recipients, only a single copy of the message is stored in the database 102, and each notification message 245 relates back to the single copy of the voice message.

As illustrated in FIG. 2A, the notification message 245 may include an indication that User B has received a voice message. The message 245 further includes a retrieval phone number (i.e., "[CC]") for retrieving voice message 220. In this or alternative implementations, message 245 can further include information to inform User B that the voice message was received from User A, date and time information for the voice message, as well as an indication of whether the message was sent to other recipients and/or the identities of the other recipients.

Message 245 can also include message thread information regarding whether message 220 is a response to a previous message (and/or who created the previous message), is a forwarded message, and the like for indicating how the message 220 fits into a given conversation thread. One will appreciate that adding these sorts of text to notification message 245 can reduce the delay that may otherwise accompany the retrieval of a voice message because reading text header information tends to be much quicker than listening to audible header information from a voice message service.

Such minimization of the retrieval phone numbers is possible at least in part since the intended recipients will generally be easily differentiated when calling the VM Provider 200 to retrieve their messages. For example, when User B calls phone number "[CC]," the phone number from which User B calls may also send caller ID or ANI (automatic number identification) information. This information may be used by the VM service provider Similarly, when User C calls the phone number "[BB]" User C's phone may send a different caller ID or ANI information. This recipient information is used, in combination with the message retrieval phone number dialed by the recipient to identify the appropriate voice message.

In certain cases, such as where caller ID or ANI information may be unavailable or insufficient to uniquely identify a particular user, VM Provider 200 may collect a numerical password, a private keyword, or the like for identifying the recipient. Alternatively, the recipient may submit his or her telephone number (if this information is not already known by the VM service provider 200) for identifying the recipient. In any case, the VM service provider 200 searches the index 240 for the recipient identifier 204 and the message retrieval telephone number 206 received from the recipient's phone (e.g. User B) to identify the message is to be played back to the recipient.

To retrieve a particular message, in one embodiment, User B may simply select a link containing the retrieval phone number provided in the notification message 245. In addition or in the alternative, User B may press a "send" key on a telephone 208 while the notification message 245 is being displayed in the telephone's display. Alternatively, User B may manually dial the retrieval telephone number "[CC]" provided in the notification message 245 to initiate a telephone connection with the second access point 235.

Figure 2B:
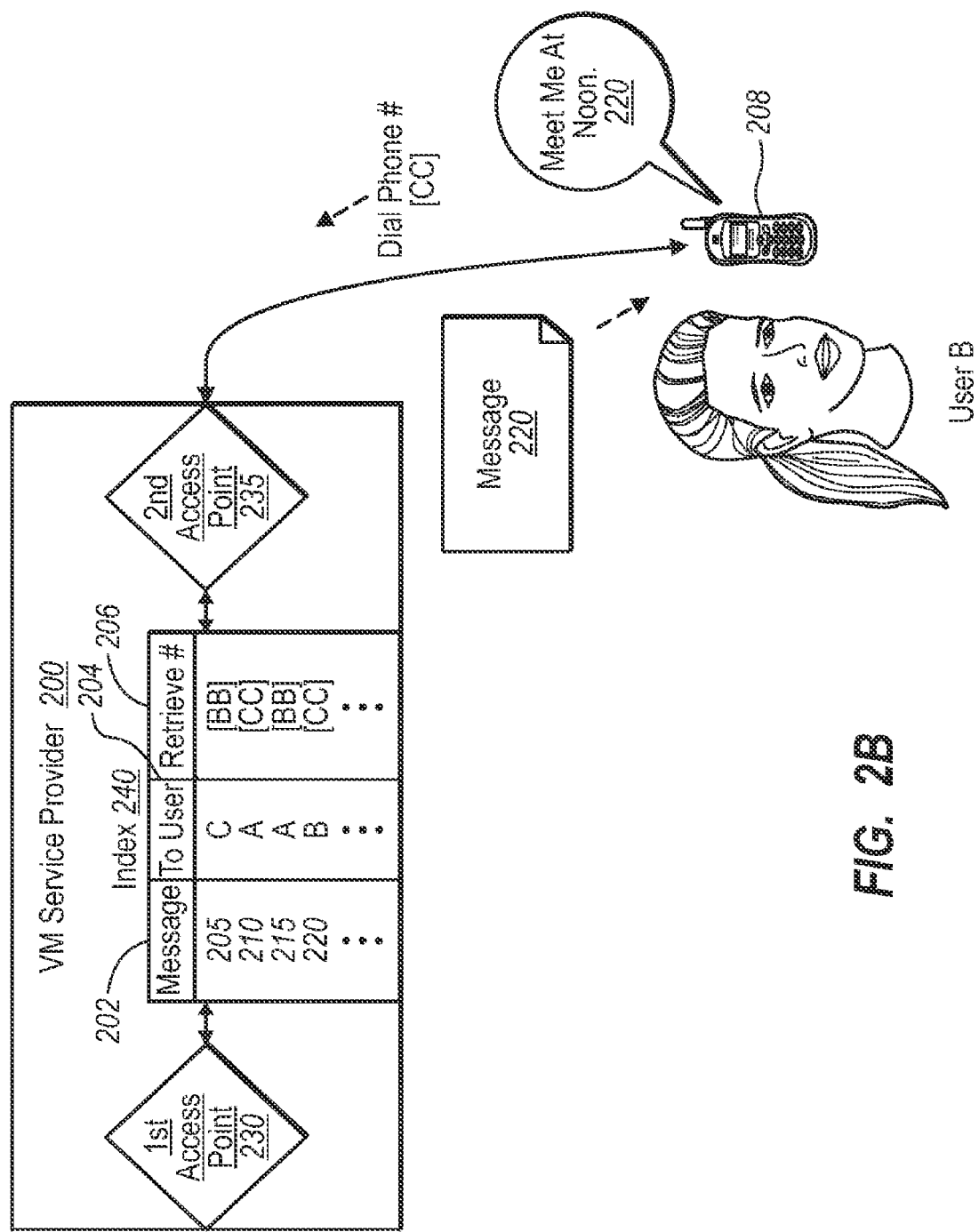
FIG. 2B illustrates the example schematic diagram of FIG. 2A in which the created voice message is delivered to the intended user in accordance with an implementation of the present invention.

As shown in FIG. 2B, for example, User B initiates a telephonic connection with a second access point 235 by dialing the provided retrieval phone number assigned to the voice message 220 (i.e., "[CC]"). The voice message service provider 200 identifies any indicia provided by User B such as User B's caller ID, ANI information, or, if not available, requesting some other form of unique identification information (e.g., voice or keypad based passwords/secrets). Upon identifying the appropriate indicia from User B, the voice message service provider 200 searches the index 240 to determine that message 220 is to be retrieved. Message 220 is retrieved and returned to User B's phone via the second access point 235. Accordingly, FIG. 2B shows that User B's phone plays message 220 "Meet me at noon," after dialing the provided retrieval phone number.

Figure 3:
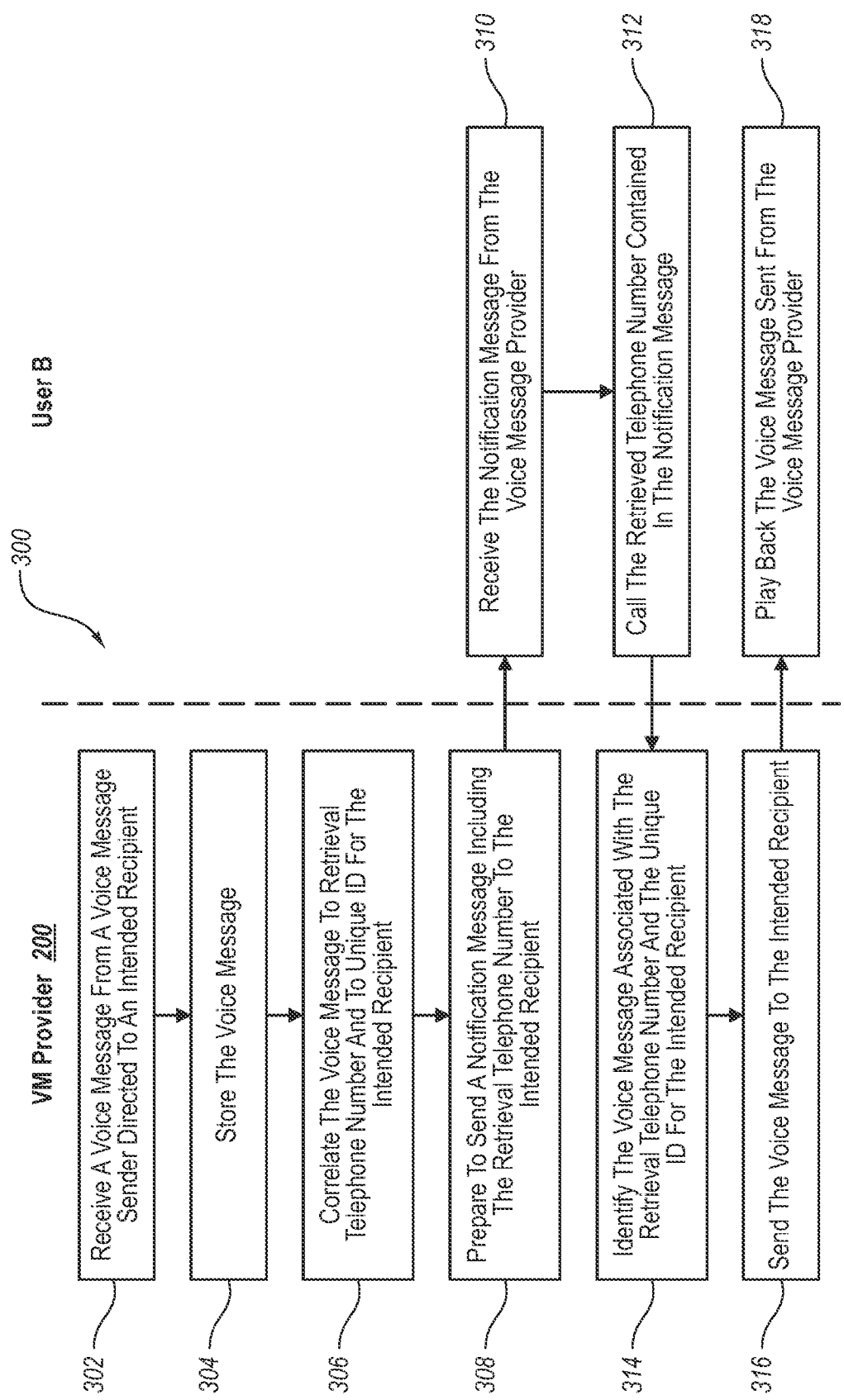
FIG. 3 illustrates flowcharts of example methods in accordance with an implementation of the present invention from the perspective of a voice message service provider and of a user.

As such, FIGS. 2A and 2B illustrate a number of components, modules and schematics for creating and retrieving voice messages through two different, unique access points. Implementations of the present invention can also be described in terms of flowcharts of methods comprising one or more acts for accomplishing a particular results. For example, FIG. 3 illustrates an example method 300 from the perspective of VM service provider 200 and User B for delivering and retrieving voice messages. The example method illustrated in FIG. 3 is described below with reference to the components and schematics described in FIGS. 2A and 2B.

The method 300 includes receiving, at 302, a voice message from a voice message sender directed to an intended recipient. As shown in FIG. 2A, for example, User A establishes a connection with the first access point 230 of VM service provider 200 and creates a voice message 220. The method 300 further includes, at 304, storing the voice message. Referring again to FIG. 1, the voice message may be stored in a database 102 at the VM service provider 100.

The voice message is then correlated to a retrieval telephone number and to a unique ID for the intended recipient, as denoted at 306. For example, and referring to FIG. 2A, upon receiving the voice message from the sender, the VM service provider 200 may assign the retrieval telephone number to the voice message and the recipient's unique ID, and store the correlated data in the index 240. The unique ID may include a caller ID, ANI information, or some other form of identification for User B.

The method 300 further includes, at 308 preparing and sending a notification message that includes the message retrieval telephone number to the intended recipient. For example, FIG. 2A shows that VM Provider 200 prepares and sends message 245 to User B's phone (or other registered recipient device). Message 245, may include textual header information to notify the intended recipient that the voice message 220 has been received, the identity of the sender of the voice message 220, and/or any date/time information. As previously mentioned, the notification message 245 may also include enhanced information, such as whether message 220 is part of a general thread of messages, or the like.

The notification message sent from the voice message provider is then received by the intended recipient (User B), as denoted at 310. For example, FIG. 2B shows that User B's phone receives the notification message 245 from VM Provider 200, where the message 245 includes at least a notification that a particular voice message has been received for User B. In addition, FIG. 3 shows that the method 300 may further include calling, at 312, the retrieval phone number contained in the received message. The call may be automatically initiated when the users mobile telephone receives an indication from the user that the voice message is to be retrieved, such as when the user selects the notification message and/or a link to the message retrieval telephone number contained in the voice message. For example, FIG. 2A shows that message 245 includes one or more references to retrieval phone number "[CC]," which, when combined with an identifier for User B, is unique for the message 220. Thus, to access message 220, FIG. 2B shows that User B calls the provided retrieval phone number "[CC]" and connects to the second access point 235.

FIG. 3 further shows that the VM service provider 200 identifies the voice message associated with the retrieval telephone number and the unique ID for the intended recipient, at 314. For example, upon dialing the provided retrieval phone number "[CC]," and after having sent any appropriate unique indicia, such as caller as ID, ANI information, shared secret (s) or the like, VM service provider 200 may locate the appropriate voice message by searching the index 240. The method 300 then sends the voice message to the intended recipient, at 316. For instance, and referring to FIG. 2B, the VM service provider 200 returns the uniquely assigned message 220 to User B's phone (or appropriate device). Upon receiving the voice message, User B's phone then plays back the voice message sent from the voice message provider, at 318.

As such, implementations of the present invention provide a number of schematics, components, and methods for creating and retrieving voice messages through two or more access points (a send access point and a retrieve access point of a voice message provider). One will appreciate that such schematics and components can provide a number of efficiencies over conventional voice messaging systems, at least in part since users can simply dial a unique telephone number associated with a particular voice message. Furthermore, one will appreciate that such efficiencies can also be realized since much of the header information that would otherwise be audibly presented to a user by a voice message interface can be placed into a text notification. As previously mentioned, such text can include not only who created the voice message, but other information such as date, time, length of message, and/or whether the message relates to another message (or is in response to another message), etc.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. At a voice message provider, a method of delivering voice messages to an intended recipient, comprising:
   receiving a voice message from a sender directed to an intended recipient;
   storing the voice message in a database;
   assigning a retrieval telephone number to the received voice message;
   correlating the retrieval telephone number and the received voice message to one or more recipient identifiers for identifying the intended recipient;
   preparing a notification message including at least the retrieval telephone number assigned to the received voice message;
   sending the notification message to the intended recipient that, when selected by the intended recipient, causes the voice message to be retrieved from the database;
   receiving a telephone call from the intended recipient, the telephone call being initiated by intended recipient's selection of the notification message which dials the retrieval telephone number included in the notification message;
   identifying the voice message correlated to the retrieval telephone number and to the recipient identifier; and
   sending the voice message to the intended recipient.

2. The method as recited in claim 1, wherein the notification message, when selected by the intended recipient, automatically retrieves the voice message from the database by automatically dialing the phone number assigned to the received voice message.

3. The method as recited in claim 1, wherein assigning a phone number to the received voice message further comprises selecting the phone number from a predefined list of message retrieval phone numbers.

4. The method as recited in claim 3, wherein selecting the phone number from a predefined list of message retrieval phone numbers further comprises selecting one of the message retrieval phone numbers that has not already been assigned to another voice message for the intended recipient.

5. The method as recited in claim 1, wherein correlating the retrieval telephone number and the received voice message to one or more recipient identifiers for identifying the intended recipient further comprises storing the correlation between the retrieval telephone number, received voice message, and recipient identifiers in a searchable index.

6. The method as recited in claim 1, wherein preparing a notification message including at least the retrieval telephone number assigned to the received voice message further comprises including thread information for the voice message within the notification message.

7. The method as recited in claim 1, wherein preparing a notification message including at least the retrieval telephone number assigned to the received voice message further comprises preparing at least one of a short messaging system ("SMS") message, a multimedia messaging system ("MMS") message, an instant message ("IM"), and an email.

8. The method as recited in claim 1, wherein receiving a voice message from a sender directed to an intended recipient further comprises receiving the voice message from the sender via a first access point, and wherein receiving a telephone call from the intended recipient further comprises receiving the telephone call from the intended recipient via a second access point, wherein the first access point is distinct from the second access point.

9. The method as recited in claim 1, wherein the recipient identifiers include at least one of a caller ID for the intended recipient, a telephone number for the intended recipient, and a username or password for the intended recipient.

* * * * *